April 2, 1963 C. J. PETERS 3,084,227

MAGNETIC TAPE TRANSDUCER

Filed Sept. 29, 1959 2 Sheets-Sheet 1

INVENTOR.
CHARLES J. PETERS

BY Spencer E. Olson

ATTORNEY

MAGNETIC TAPE TRANSDUCER

Filed Sept. 29, 1959 2 Sheets-Sheet 2

INVENTOR.
CHARLES J. PETERS
BY Spencer E. Olson
ATTORNEY

United States Patent Office 3,084,227

Patented Apr. 2, 1963

3,084,227

MAGNETIC TAPE TRANSDUCER

Charles J. Peters, Wayland, Mass., assignor to Sylvania Electric Products Inc., a corporation of Delaware Filed Sept. 29, 1959, Ser. No. 843,275
15 Claims. (Cl. 179—100.2)

This invention relates to magnetic recording and reproduction, and particularly to the magnetic recording and reproduction of video or digital signals. This application is a continuation-in-part of my copending application Serial Number 741,401, filed June 11, 1958, and assigned to the same assignee as the present application.

In my aforesaid application is described a system for recording and reproducing video signals as a series of transverse lines or tracks on a tape wherein scanning across the tape is accomplished electrically to eliminate the defects of prior art rotating head systems. Briefly, this system comprises a block of ferromagnetic material of a length at least as long as the width of the magnetizable tape with means coupled to the ends thereof for producing opposing magnetic fields in the member of sufficient intensity to saturate the member everywhere except in a small region where the fields cancel. Throughout the portions of the block where flux density is sufficiently high to cause saturation, the incremental permeability of the member falls to about the permeability of air, whereas in the region of field cancellation the permeability is high. By rapidly differentially varying the intensities of the opposing magnetic fields, the high permeability region is scanned back and forth between the ends of the block. The signal coil is coupled to a magnetic circuit which includes a probe arranged closely parallel to and of a length equal to the length of the block to define a recording gap coextensive with the width of the tape. The signal to be recorded is coupled to the probe to provide across the gap, throughout its length, a magnetic field modulated in accordance with the signal. Although a signal-modulated magnetic field is present throughout the length of the gap, sufficient flux for recording passes through the tape from the probe only in the high permeability region with the consequence that the signal-modulated magnetic field is impressed on the tape only at the high permeability zone. Thus, with the movement of the high permeability region along the recording gap, transversely across the tape, while the tape is simultaneously moved through the gap, the information is laid down along transverse tracks. The tape is transported through the gap at readily attainable velocities, for example 30 to 120 inches per second, using available tape transport means, and the rate of scanning of the high permeability zone being limited only by the rate at which the saturating magnetic fields can be varied, video signals may readily be recorded.

The primary object of the present invention is to improve the resolution and fidelity of reproduction of the system disclosed in the aforesaid copending application.

Briefly, the present transducer utilizes the same principle of operation, but incorporates features of construction which reduce the power requirements for producing and scanning the region of high permeability, for reducing the size of the recording "spot" to improve the resolution of recording, and more accurately to establish and maintain the dimensions of the recording gap. In general, these advantages are attained by forming the member in which the high permeability zone is scanned so that it has a very small cross-section, it having been found that relatively low power, in terms of ampere-turns on the electromagnets, is sufficient to cause saturation therein and to produce a very narrow high permeability region throughout its traverse from one end of the member to the other. Vanadium Permendur has been found to be particularly suitable for this member, and in a preferred embodiment takes the form of a pair of spaced apart "bars" supported on a flat plate or block, with the cores of a pair of electromagnets magnetically coupled to the respective ends of the bars. A thin sheet of material possessing substantially square magnetization characteristics, such as Permalloy, is placed between the two "bars" and coupled thereto, the high permeability region produced by the opposing magnetic fields occuring in this strip.

Supported above the block is a signal probe arranged parallel to and closely spaced with the Permalloy strip to define a recording gap coextensive with the width of the tape. The probe comprises a vertically disposed "blade" and a pair of shoes spaced on either side of the blade in the direction of tape travel, the blade and shoes being coupled together and formed of magnetic permeable material to constitute a magnetic circuit. The signal to be recorded is coupled to the "blade" of the probe to provide across the gap, throughout its length, a magnetic field modulated in accordance with the signal. As in the above-described system, although a signal-modulated magnetic field is present throughout the length of the gap, flux passes directly through the tape to the Permalloy sheet only in the high premeability region in the Permalloy, and that flux which does not pass directly to the high permeability region travels from the tip of the blade to the shoes across the air gap therebetween. Because of the relatively long air path the flux density is low, and consequently the signal-modulated magnetic field is of sufficient intensity to be impressed on the tape only at the high permeability zone. Accordingly, when the tape is moved through the gap simultaneously with the scanning of the high permeability zone transversely of the tape, the signal is recorded along transverse tracks on the tape.

Other objects, features and advantages of the invention will become apparent from the following description of a preferred embodiment, reference being had to the accompanying drawings, in which.

Figure 6:
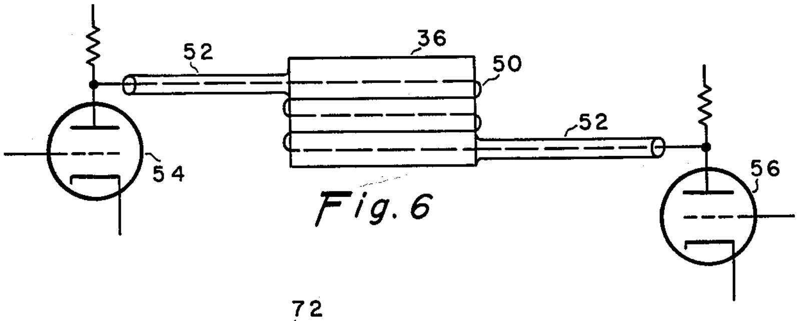
Figure 7:
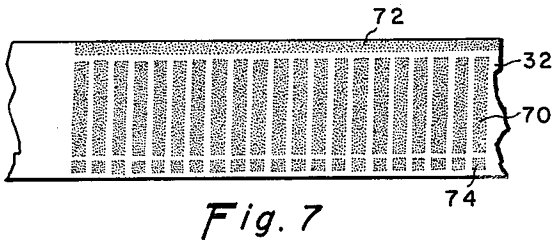

FIG. 6 diagrammatically illustrates one method of applying signals to the recording probe of the transducer; and FIG. 7 is a plan fragmentary view of a tape illustrating the pattern of signals recorded thereon.

Figure 1:
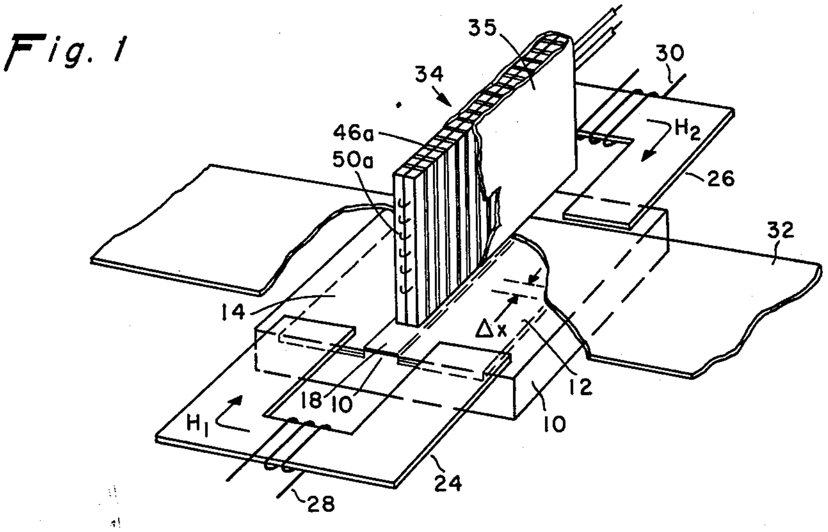
FIG. 1 is an isometric view, somewhat diagrammatic, of the transducer in accordance with the invention.
Figures 2, 2A, 2B:
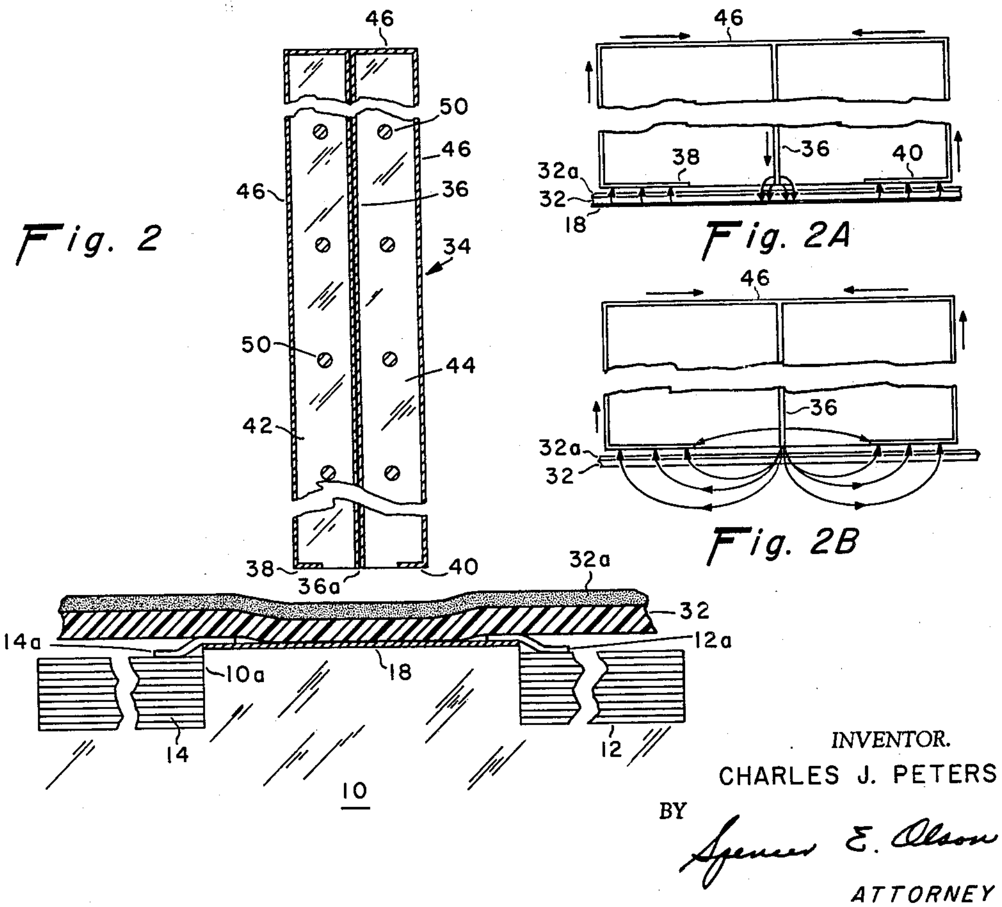
FIG. 2 is a vertical cross-sectional view, greatly enlarged, taken through FIG. 1.
FIGS. 2A and 2B are respectively schematic diagrams, greatly enlarged, of a portion of FIG. 2 illustrating the magnetic coupling between the transducer and a magnetizable medium at a high permeability zone, and at a saturated region.

Referring now to the drawings, and more particularly to FIGS. 1 and 2, the transducer in accordance with the invention includes a generally rectangular block 10, formed of insulating material capable of being machined with flat surfaces, such as glass, on the upper surface of which are supported the elements in which the high permeability zone is formed and scanned. The block 10 may be formed of ¼ inch glass, and in an actual embodiment is supported on rigid means (not shown) in a horizontal position. Supported on the upper surface of the block 10, and preferably in the plane of the upper surface, are a pair of strips of ferromagnetic material 12 and 14 arranged parallel to each other and spaced apart by a narrow gap oriented transverse of the direction of tape movement through the transducer. The thickness of the members 12 and 14, and the width of gap between them are shown somewhat enlarged in FIG. 1, and greatly enlarged in FIG. 2, the actual thickness of strips 12 and 14 being of the order of 20 to 40 mils, it being understood that a "mil" is one-thousandth of an inch. Strips 12 and 14 are preferably applied by etching or grinding the glass 10 in the areas to be occupied by the strips to a suitable depth and attaching thin strips of ferromagnetic material thereon to fill the depressed areas, whereby the upper surface of the strips 12 and 14 lie in the plane of the upper surface of the glass block 10. Strips 12 and 14 are built up of thin laminations of a material having relatively high permeability and a high saturation flux density, such as Vanadium Permendur, an alloy consisting of 1.8% vanadium, 49% cobalt, and the balance iron. Thin laminations are used to reduce eddy current losses and the magnetic characteristics are chosen to minimize the required cross-sectional area of 12 and 14.

The depressions in the upper surface of block 10 containing strips 12 and 14 are separated by a narrow ridge 10*a* (about 100 mils wide), the top surface of which is coated with a thin layer 18 of magnetic material having a square magnetization characteristic. Particularly satisfactory magnetization characteristics are possessed by certain nickel-iron alloys, such as Deltamax, consisting of 50% nickel and 50% iron, or Permalloy, having 68% nickel with the balance iron. Of these two alloys, Permalloy is preferable because of its high initial permeability. This coating, which may be of the order of one-half mil or less in thickness, is preferably applied by evaporation prior to insertion of strips 12 and 14. The film 18 is magnetically coupled to strips 12 and 14 by strips 12*a* and 14*a* of magnetic material which are respectively spot-welded along one edge to strip 12 and 14 and shaped to extend over ridge 10*a* to provide a gap about 80 mils wide between their confronting edges. As best seen in FIG. 2A, the inner edges of the strips are secured to film 18 by a gap approximately .0001 inch wide by an insulating sealing compound, indicated at 17.

A pair of electromagnets 20 and 22 are mounted at the opposite ends of block 10, respectively including U-shaped cores 24 and 26 formed, for example, of laminated strip iron, the cores being held in firm and intimate contact with strips 12 and 14 to provide efficient magnetic coupling therewith. A current coil 28 is wound on core 24, and a similar coil 30 is wound on core 26, the number of turns in each coil and the current carried thereby determining the flux produced in the strips 12 and 14. The two electromagnets 20 and 22 are wound to be magnetized as indicated by the arrows $H_1$ and $H_2$ in FIG. 1. For the indicated thickness of strips 12 and 14, it has been found that cores having 50 laminations formed of 2 mil Sinimax with 125 ampere-turns peak, a suitable flux for the purposes of the invention is produced in film 18.

With the above-described arrangement, the lines of magnetic flux from one pole of each magnet enter into one or the other of strips 12 and 14 and return by its other pole. The magnetic fields produced by the two magnets being in opposition, a small region exists within the Permalloy film 18 where the fields cancel each other. Current is passed through the coils 28 and 30 of sufficient magnitude to saturate the film 18 everywhere except in a small region around the line where they cancel, the location of this line along the length of the sheet being determined by the relative magnitudes of the current supplied to the two magnet coils. In the portions of film 18 where saturation occurs, the incremental permeability of the material falls to approximately the permeability of air, whereas in the region of field cancellation the permeability of the material of film 18 is high. This zone of high permeability may be controllably moved from one end of the sheet to the other by differentially varying the currents in coils 28 and 30.

Figure 4:
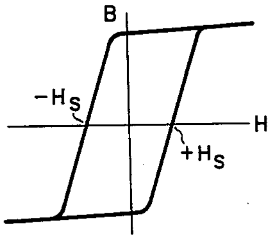
FIG. 4 is a graph of the B-H characteristic of the ferromagnetic sheet of the transducer of FIG. 1.
Figure 5:
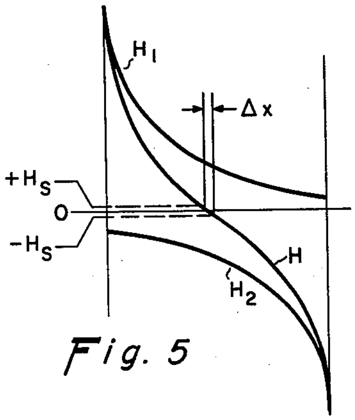
FIG. 5 is a graph illustrating the nature of the magnetic fields required to effect scanning of the high permeability zone.

More specifically, the material of film 18, preferably a nickel-iron alloy such as Permalloy, has a substantially square magnetic characteristic such as is shown in FIG. 4, and the magnetic fields produced in the film 18 are as shown in FIG. 5. In the graph of FIG. 5, the magnetic field intensity is plotted along the longitudinal axis of strip 18, designated its $x$-axis, $\pm H_s$ is the field intensity at which the material of the film saturates, $H_1$ is the field produced by magnet 20, $H_2$ is the field produced by magnet 22, and H is the total, or resultant field, of fields $H_1$ and $H_2$ for an arbitrary amplitude of current in the two coils. It will be seen that the resultant field H goes to zero at the point designated $x_1$, and that the value of H is insufficient to saturate the material over a region having a width designated $\Delta x$ centered at $x_1$. This zone of width $\Delta x$ has a much higher permeability than the saturated regions and extends across the film 18 (in the direction of tape travel) as indicated in FIG. 1. The position of $x_1$ is movable along film 18 by changing the currents in coils 28 and 30 whereby the high permeability zone of width $\Delta x$ may be scanned back and forth. The very small cross-sectional areas of strips 12 and 14 and the film 18 serve to reduce the demands on the scanning or sweeping circuitry.

Having described the means for scanning a high permeability zone across the film 18, reference is again made to FIGS. 1 and 2 for completion of the description of the transducer. The tape 32 on which the signals are to be recorded is drawn over the film 18, substantially in contact therewith with the active recording layer 32*a* of the tape on the upper side, by suitable tape transport means (not shown). Aligned with the film 18 and spaced sufficiently therefrom to allow the tape to pass through with clearance of about 0.00005 inch to 0.001 inch is a signal probe generally designated at 34. As best seen in FIG. 2, the signal probe comprises a thin blade or probe 36 formed of ferromagnetic material oriented normal to the plane of the tape, and a pair of shoes 38 and 40 closely spaced from the lower edge of probe 36. To insure maintenance of the necessary tolerances on dimensions (to be referred to later) the probe 36 and shoes 38 and 40 are preferably formed of thin sheets or coating of magnetic material on insulating support members 42 and 44 which may be formed of ceramic, or more preferably, from glass by reason of the more advanced state of the art of forming polished glass. The supports 42 and 44, one of which is a mirror image of the other, may be sheets of glass having a length substantially equal to the width of tape 32 and a cross-section of rectangular shape. Completely covering the lateral surfaces of the two sheets, except for a narrow region at one narrow edge of each, is a thin sheet or film of ferromagnetic material 46. This material may be in the form of a thin foil shaped to conform to the supports, or it may be applied as a thin film by evaporation. The two supports are firmly held together with the conductive coating on the two vertically upstanding arms in firm contact with each other to form the probe 36, the probe together with the film extending across the top and down the sides of the two supports providing a balanced magnetic circuit which is closed except for narrow gaps between the shoes 38 and 40 and the lower edge of probe 36. The lower surfaces of shoes 38 and 40 preferably lie in the same plane as the extremity of probe 36.

By way of illustrative example, the cross-section of the supports 42 and 44 may be rectangular and approximately .43 inch high, with a thickness of the order of .030 inch. The thickness of the magnetic material 46 is preferably of the order of 0.00012 to 0.0005 inch (making the thickness of probe 36, 0.00025 to 0.0010 inch). A suitable spacing between the shoes 38 and 40 and probe 36 is 0.015 inch. Before application of the film 46, at least the upper surfaces of the supports, the vertically extending surfaces and the lower edges are ground and polished to be optically flat thereby insuring maintenance of these very small dimensions. The probe structure just described is accurately positioned with respect to the film 18 and the tape 32 by a supporting structure (not shown) carried by the support for the glass block 10. This support preferably includes means for carefully adjusting the spacing of the lower edge of the probe 36 from the film 18.

From the description thus far it will be appreciated that at least a portion of the probe structure is situated in the magnetic field produced by the bars 12 and 14. Since the magnetic members of the probe structure have very small cross-sectional areas, unless adequate precautions are taken the stray magnetic field from the bars will saturate the probe structure and impair its operation. The magnitude of the stray magnetic field reaching the probe can be significantly reduced by shielding the lateral surfaces of the probe structure. A suitable shield 35, shown partially cut away in FIG. 1 (omitted in FIG. 2) may be formed by wrapping a thin strip of Permalloy around the probe, insulated from the coating 46, to cover the lateral surfaces and the ends of the probe. A shield having a thickness of about 10 mils of Permalloy, although not eliminating saturation of the probe elements by stray fields, has been found satisfactory when other precautions are taken.

It will be noted that the stray sweep field will be most intense where high magnetic potential exists between bars 12 and 14; conversely, it will be very small near the location of the high permeability zone where the magnetic potential is low. For satisfactory operation of the probe it is only necessary that a small band around the probe, opposite the high permeability zone in film strip 18, be unsaturated. This result is accomplished by forming air gaps 46a in the magnetic coating 46 on the probe structure. The air gaps may be formed by scribing lines in the film 46, each lying in a plane perpendicular to the lengthwise dimension of the probe and extending around the four sides of the probe structure. By way of example, the lines are spaced apart 0.1 inch, and on the shoes 38 and 40 and on the probe 36 are approximately 0.0001 to 0.0003 in. wide. On the vertical lateral surfaces and across the top edge of the structure, the lines are approximately 0.003 in. wide. The narrow lines on the shoes and probe are required to prevent the gaps 46a from affecting the signal flux distribution in the tape, and the wider line width on the other surfaces facilitates the scribing operation.

The effect of the air gaps 46a is to form bands of material which are magnetically isolated from each other. Thus, the band which is opposite the high permeability zone will be unsaturated because the magnetic potential between bars 12 and 14, and hence the intensity of the stray sweeping field, is low at this point, whereas the bands or strips on either side may be saturated because of the higher magnetic potential between the bars. Thus, the air gaps isolate the active band (opposite the high permeability region) from the rest of the bands. Because of this isolation, the unactive portions of the probe structure can be saturated without degrading the performance of the probe.

The sharp edge 36a of probe 36 together with that portion of film 18 lying between the confronting edges of strips 12a and 14a define a recording gap through which the tape 32 is drawn, the gap having a length coextensive with the width of the tape. The tape is drawn through the gap with the active surface 32a thereof on the upper side and spaced from the lower edge of the probe structure, and the under surface of the tape in contact with the film 18. The signal to be recorded, for example a video signal such as a television picture signal, or digital information, is coupled to probe 36 to provide across the gap between edge 36a (FIG. 2) and film 18, throughout the length of the gap, a magnetic field modulated in accordance with the signal. FIG. 6 diagrammatically illustrates a suitable circuit for coupling signals to the probe. To handle the wide bandwidths contemplated by the invention, the signal is preferably applied over a coaxial line 52, for example, from a balanced driving circuit including tubes 54 and 56. The coil 50 is a continuation of the center conductor of coaxial lines 52, and may be formed by embedding or otherwise containing a plurality of conductors in glass support members 42 and 44 which are connected one to the other at 50a (FIG. 1) to make a continuous electrical circuit surrounding the probe 36. The diameter of the conductors 50 is chosen such that the conductors and the outer conducting sheath 46 of the two halves of the probe structure behave as a transmission line. The outer conductors of coaxial lines 52 are respectively electrically connected to the opposite ends of the coating constituting the probe 36, and to the shield 35, the coated area 46 and the shield and the probe 36 thereby constituting the outer conductor of a section of transmission line. In other words, by suitable selection of the diameter of the wire of coil 50, and appropriate spacing between the wires of the coil and the coated surfaces of the probe, the turns of the coil constitute one conductor of a strip transmission line and the outer conducting surfaces of the probe structure serve as the other conductor, and with a suitable dielectric constant for the members 42 and 44, this section of line can be made to have the same characteristic impedance over a broad range of frequencies as the lines 52. By way of example, with number 42 wire embedded in a half probe of glass of thickness of 0.30 inch with a conducting magnetic coating of 0.0005 inch on the exterior surfaces of the half probe, the characteristic impedance of the resulting transmission line is approximately 50 ohms. Obviously, placing two half probes together to form a complete recording-reproducing structure and connecting the embedded wires to form a continuous coil does not change the electrical behavior of the transmission line. The use of a balanced drive circuit in the configuration of FIG. 6 minimizes reflections which would otherwise affect the fidelity of recording. For playback, one end of the transmission line is terminated in its characteristic impedance and the other connected to a suitable amplifier.

The modulation employed in the above-described transducer is known in the art as "frequency modulation," which may be accomplished by circuitry of the type illustrated in FIG. 9 of my aforesaid application or other circuitry known to the art. With the signal modulated magnetic field present across the recording gap throughout its length, the instantaneous signal may be recorded on the tape at any point across its width where the flux density in the tape is sufficient; from what has been said before, this is only at the high permeability zone in film 18. This will be more clearly understood from an examination of FIGS. 2A and 2B which respectively diagrammatically illustrate, greatly enlarged, the magnetic circuit in the vicinity of the tape at a region of high permeability in the film 18, and in a region where the material of the film is saturated. As seen in FIG. 2A, the path of the signal flux is from the knife-edge 36a through the tape 32 and into the film 18 by reason of the low reluctance of the film 18 in the high permeability region, the flux lines being concentrated at this point and substantially normal to the tape surface. Upon entry into the film 18, the flux divides and passes in both directions along film 18 and after crossing the air gap re-enters the probe structure through shoes 38 and 40, and thence passes upward along the coating 46 on the lateral surfaces of the support and into the probe 36. Because the area of the air gaps at shoes 38 and 40 is considerably greater than that of the knife-edge 36a, the density of the flux on its return through the tape into the shoes is insufficient to be recorded on the tape. Thus, by reason of the low reluctance path from the knife-edge 36a through the tape to the high permeability zone in film 18, the signal modulated field, is in effect, concentrated at the high permeability zone, and at this region only is of sufficient density to be recorded on the tape.

In the saturated portions of film 18, shown in FIG. 2B, the permeability of the film material approaches that of air, and for this reason the film 18 has not been illustrated. As before, the path of the signal flux is from the knife-edge 36a and thence back to the shoes 38 and 40. Some of the flux returns to the shoes without passing through the film, as shown, and some passes along relatively long paths, twice transversing the tape before returning to the shoes. The reluctance of the air path from the knife-edge to the shoes (the reluctance of the saturated film 18 approaches that of air) is much higher than with the conditions shown in FIG. 2A, and the density of such flux as does pass through the tape is insufficient to be recorded.

From the foregoing it is seen that the high permeability zone in film 18 and the elemental portion of knife-edge 36a directly opposite the zone form a "recording aperture" of small dimensions. The dimension of this "aperture" in the direction of tape travel is about 2 mils, being largely determined by the shape and dimensions of the probe and shoes. The dimension transverse to the direction of tape motion is determined by the width of the high permeability zone in the maetrial of film 18, a dimension of the order of 4 mils being obtainable. The recording aperture is rapidly movable transversely of the tape by differentially varying the intensities of the opposing magnetic fields in film 18, with the signal being recorded on the tape only at the instantaneous position of the "recording aperture."

Figure 3:
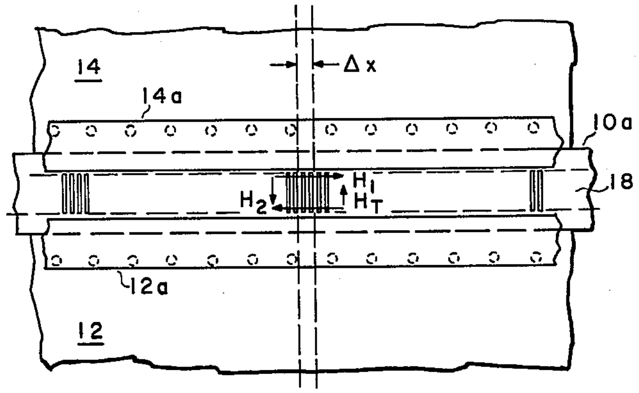
FIG. 3 is a fragmentary plan view, greatly enlarged, of the structure wherein the high permeability zone is produced.

To enhance the resolution of the transducer the dimension of the "recording aperture" in the direction transversely to tape movement can be improved to some extent by bringing the shoes 38 and 40 closer to the knife-edge 36a, but when this is done the definition between adjacent lines is lost. In accordance with one feature of the invention, narrow air gaps 18a are formed in film 18 (FIG. 3) in the space or gap 16 between coupling strips 12a and 14a. The gaps 18a (only a few are shown in FIG. 3) are preferably formed in film 18 by etching, or by evaporation through a grid mask of fine wire, and ideally have a width of about 2.5 microinches and a spacing between slots of about 2 mils, which it will be noted is less than $\Delta X$, the width of the high permeability zone in the direction transversely of the tape. It will be recalled that spacing between magnetic coupling numbers 12a and 14a is about 0.10 inch making the dimensions of the slots 18a 0.0000025 by 0.10 inch. The effect of these gaps is to elongate the high permeability zone in the direction of tape travel. When the gaps 18a are not present, the magnetic field produced in the film 18 by the bars 12 and 14 has components both along the bars ($H_1$ and $H_2$ in FIG. 3) and perpendicular to the bars ($H_T$ in FIG. 3). Because of these several components, the lines of constant field intensity H in an isotropic plate would be circles centered on the high permeability zone. Under these conditions, the boundary of the high permeability zone would be a circle.

However, to obtain good magnetic coupling between the high permeability zone and the shoes 38 and 40, the high permeability zone must extend under the shoes. To obtain a small value for $\Delta X$, then, the shoes must be brought near the probe. If the shoes are too close to the probe, discrimination between adjacent recorded lines is lost. If the shoes are spaced sufficiently far from the probe to obtain good discrimination between adjacent lines, the high permeability zone must be too large, thus sacrificing bandwidth. The solution is to remove the fields $H_1$ and $H_2$ (FIG. 3) from the material of film 18, this being accomplished by the small air gaps 18a. Because of the higher reluctance of the air gaps, most of the field $H_1$, $H_2$ appears across the air gaps and not in the magnetic material. In this manner, most of the field $H_1$ and $H_2$ is removed from the film material without disturbing the transverse field $H_T$ with the result that the high permeability zone is long and narrow. Thus, wide bandwidth is retained without sacrificing discrimination between adjacent lines.

The present transducer may be used with tape transport mechanisms similar to that found in many profressional magnetic audio recorders of the type illustrated in FIG. 5 of my aforementioned application. Of course, other forms of tape transports may be used, the principal requirement being to draw the tape through the recording head in a direction transverse to the gap 16 at a suitable velocity. Since scanning across the tape is done electrically, the sweep need not be periodic, and likewise it may be desirable to employ a tape transport mechanism which may be rapidly started and stopped. In other words, scanning may be suddenly and rapidly started or stopped as dictated by requirements of recording or read-out and the tape started, stopped, or reversed to provide random access of information, as would be encountered in computer applications.

With the described transducer and tape movement, the recorded tape, in the case of television recording, has three separate, but synchronized magnetic tracks as shown in FIG. 7. The first is a series of transverse video tracks 70, laid down by the transducer, each carrying, for example, one line of television information. The second is the sound track that accompanies the picture, and may be impressed along an edge of the tape at 72 by a suitable audio recording transducer. The third track, indicated at 74, is a synchronizing signal which may comprise a train of pulses coincident with the horizontal synch pulse of each line of the television picture. It is to be understood, however, that this is an illustrative pattern only, and may take a somewhat different form should the transducer be used in a computer, for example. In any case, however, the video information is laid down in transverse tracks with scanning across the tape accomplished electrically as above described.

Although the invention has been described as incorporated in a specific embodiment, those skilled in the art may now make numerous modifications of and departures from this specific embodiment without departing from the inventive concepts. Consequently, the invention is to be construed as limited only by the spirit and scope of the appended claims.

What is claimed is:

1. A transducer for interaction with a magnetizable medium comprising, a flat support member formed of dielectric material arranged on one side of the magnetizable medium, a thin coating of magnetic permeable material on a narrow strip portion of said member, magnetic permeable members on said support magnetically coupled to said coating of magnetic permeable material, means magnetically coupled to the ends of said members for producing opposing magnetic fields in said coating of sufficient intensity to saturate the material of said coating everywhere except around a narrow region where the fields cancel to thereby produce in said coating a narrow high permeability region, means for shifting the position of said high permeability region, and a signal probe arranged on the other side of the magnetizable medium and including a second support member formed of dielectric material having a covering of magnetic permeable material on portions thereof to define a magnetic circuit having an elongated air gap, said second support being disposed to position said air gap in confronting relationship with said strip portion and closely parallel thereto.

2. A transducer for interaction with a magnetizable medium comprising a flat support member formed of dielectric material arranged on one side of the magnetizable medium, a thin coating of magnetic permeable material on an elongated narrow strip portion of said member, magnetic permeable members on said support member closely adjacent opposite edges of said strip portion and magnetically coupled to said coating of magnetic permeable material, means magnetically coupled to the ends of said magnetic permeable members for producing opposing magnetic fields of sufficient intensity to saturate the material of said coating everywhere except around a narrow region where the fields cancel, and a signal probe arranged on the other side of the magnetizable medium and including an elongated support member of rectangular cross-section formed of dielectric material having a covering of magnetic permeable material on the lateral surfaces thereof except for a narrow elongated area extending along one lateral surface of said support in a direction parallel to the axis thereof, said elongated support being supported to position said elongated area in confronting relationship with said strip portion and closely parallel thereto.

3. A transducer for interaction with a magnetizable medium comprising a flat support member formed of dielectric material arranged on one side of the magnetizable medium, a thin coating of magnetic permeable material on an elongated narrow strip portion of said support member, magnetic permeable members on said support closely adjacent opposite edges of said strip portion and magnetically coupled to said coating of magnetic permeable material, means magnetically coupled to the ends of said magnetic permeable members for producing opposing magnetic fields in said coating of sufficient intensity to saturate the material of said coating everywhere except around a narrow region where the fields cancel to thereby produce in said coating a narrow high permeability region, said coating having a plurality of narrow, closely spaced air gaps formed therein oriented transversely of said strip portion and distributed along the length of said strip portion means for shifting the position of said high permeability region, and a signal probe structure arranged on the other side of the magnetizable medium and including a second support member formed of dielectric material having a covering of magnetic permeable material on portions thereof defining a magnetic circuit having an elongated air gap, said second support member being supported closely parallel to said narrow strip portion to position said air gap in confronting relationship therewith, said probe structure with said narrow strip portion defining a recording gap through which said magnetizable medium is adapted to be moved.

4. A transducer for interaction with a magnetizable medium comprising a flat support member formed of dielectric material arranged on one side of the magnetizable medium, a thin covering of magnetic permeable material on an elongated narrow strip portion of said member, a pair of magnetic permeable members on said support closely adjacent opposite edges said strip portion and magnetically coupled to said covering of magnetic permeable material, means magnetically coupled to the ends of said magnetic permeable members for producing opposing magnetic fields in said coating of sufficient intensity to saturate the material of said coating everywhere except around a narrow region where the fields cancel, said coating having a plurality of closely spaced narrow air gaps formed therein oriented transversely of said strip portion and distributed along the length of said strip portion, and a signal probe arranged on the other side of the magnetizable medium and including an elongated support member of rectangular cross-section formed of dielectric material having a covering of magnetic permeable material on the lateral surfaces thereof except for a narrow elongated area extending in a direction parallel to the axis thereof, said support being supported to position said elongated area in confronting relationship with said strip portion and closely parallel thereto to define a recording gap through which said magnetizable medium is adapted to be moved.

5. A transducer for interaction with a magnetizable medium comprising, a flat support member arranged on one side of the magnetizable medium and having length and width dimensions and having a narrow ridge on one surface thereof, a thin film of magnetic permeable material on said ridge, a pair of magnetic permeable members magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel, said film having a plurality of narrow gaps formed therein oriented transversely of said ridge and distributed along the length dimension of said ridge, said gaps having a smaller dimension in the direction of the length dimension of said ridge than the dimension of said high permeability region in the same direction; and a signal probe structure arranged on the other side of the magnetizable medium and comprising an elongated flat support member formed of dielectric material having a covering of magnetic permeable material on portions thereof defining a thin probe and a pair of shoes spaced therefrom, said probe structure being supported to position said probe and shoes closely parallel to said ridge and defining therewith a recording gap through which said magnetizable medium is adapted to be moved.

6. A transducer for interaction with a magnetizable medium comprising, a flat support member arranged on one side of the magnetizable medium and having length and width dimensions and having in one surface thereof a pair of slots extending in the length direction and spaced apart in the width direction by a narrow ridge, a thin film of magnetic permeable material on said ridge, a pair of magnetic permeable members disposed in said slots and magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel to thereby produce in said film a narrow high permeability region, said film having a plurality of narrow gaps formed therein oriented transversely of said ridge and distributed along the length dimension of said ridge, said gaps having a smaller dimension in the direction of the length dimension of said ridge than the dimension of said high permeability region in the same direction, and means for shifting said high permeability region back and forth along the length dimension of said film; and a signal probe structure arranged on the other side of said magnetizable medium and comprising an elongated flat support member formed of dielectric material having a covering of magnetic permeable material on portions thereof defining a thin probe and a pair of shoes spaced therefrom by substantially parallel elongated air gaps, said probe structure being supported to position said probe and shoes closely parallel to said ridge and defining therewith a recording gap through which said magnetizable medium is adapted to be moved, the covering of magnetic material on said probe structure having a plurality of narrow gaps formed therein lying in planes perpendicular to said length dimension and distributed along said length dimension.

7. A transducer for interaction with a magnetizable medium comprising, a flat support member arranged on one side of the magnetizable medium and having length and width dimensions and having in one surface thereof a pair of slots extending in the length direction and spaced apart in the width direction by a narrow ridge, a thin film of magnetic permeable material on said ridge, a pair of magnetic permeable members disposed in said slots and magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel to thereby produce in said film a narrow high permeability region, and means for shifting said high permeability region back and forth along the length dimension of said film, said film having a plurality of narrow gaps formed therein oriented transversely of said ridge and distributed along the length dimension of said ridge, said gaps having a smaller dimension in the direction of the length dimension of said ridge than the dimension of said high permeability region in the same direction; and a signal probe structure arranged on the other side of the magnetizable medium and comprising an elongated flat support member formed of dielectric material having a film of magnetic permeable material on portions thereof defining a thin probe and a pair of shoes spaced therefrom by a pair of elongated air gaps and parallel thereto, said probe structure being supported to position said probe and shoes closely parallel to said ridge and defining therewith a recording gap through which said magnetizable medium is adapted to be moved, the film of magnetic material on said probe structure having a plurality of narrow gaps formed therein lying in parallel planes perpendicular to said length dimension and distributed along said length dimension, and signal coupling means including a plurality of conductors within said support member and surrounding said probe and with said probe and said film of magnetic permeable material constituting a section of broad band transmission line.

8. A transducer for interaction with a magnetizable medium comprising, a flat support member arranged on one side of the magnetizable medium having length and width dimensions and having in one surface thereof a pair of slots extending in the length direction and spaced apart in the width direction by a narrow ridge, a thin film of magnetic permeable material on said ridge, a pair of magnetic permeable members disposed in said slots and magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel; and a signal probe structure supported on the other side of the magnetizable medium and comprising an elongated flat support member of rectangular cross-section formed of dielectric material having a covering of magnetic permeable material on the lateral surfaces thereof except for a narrow strip extending along one lateral surface thereof, a thin sheet of magnetic permeable material within said flat support member disposed in a plane perpendicular to said one lateral surface and centrally of said narrow strip constituting a probe, said probe structure being supported to position said narrow strip closely parallel to said ridge and defining therewith a recording gap through which said magnetizable medium is adapted to be moved, the film of magnetic material on the lateral surfaces of said probe structure and said sheet having a plurality of narrow gaps formed therein lying in parallel planes perpendicular to said length dimension and distributed along said length dimension, a magnetic shield surrounding the lateral surfaces of said probe structure, and signal coupling means including a plurality of conductors within said flat support member and surrounding said probe and with said probe and said film of magnetic permeable material constituting a section of broad band transmission line.

9. A transducer for interaction with a magnetizable tape comprising, a flat support member arranged on one side of the tape and having a length dimension at least as great as the width of said tape and having in one surface thereof a pair of slots extending in the length direction and spaced apart by a narrow ridge, a thin film of magnetic permeable material on said ridge, a pair of magnetic permeable members disposed in said slots and magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel, means for moving said region back and forth in said film, said film having a plurality of narrow gaps formed therein oriented transversely of said ridge and distributed along the length dimension of said ridge, said gaps having a smaller dimension in the direction of the length dimension of said ridge than the dimension of said high permeability region in the same direction, and a signal probe structure supported on the other side of the tape and comprising a pair of elongated flat support members of rectangular cross-section each coated on its lateral surfaces except for a narrow strip along an edge of one lateral surface by a film of magnetic permeable material, said flat support members being joined at opposite lateral surfaces thereof with corresponding edges in juxtaposition to define a thin probe and a pair of shoes spaced therefrom, said probe structure being supported to position said probe and shoes closely parallel to said ridge and defining therewith a recording gap through which said tape is adapted to be moved, the film of magnetic material on the support members of said probe structure having a plurality of narrow gaps formed therein extending around said support members and lying in planes perpendicular to said length dimension and distributed along said length dimension, a magnetic shield surrounding the lateral surfaces of said probe structure, and signal coupling means including a plurality of conductors within each of the flat support members of said probe structure and connected at their ends and with the film of magnetic permeable material on said probe structure and said magnetic shield constituting a section of broad band transmission line.

10. A magnetic recording system comprising, a magnetizable tape, a support member formed of dielectric material having a length dimension at least as great as the width of said tape arranged on one side of the tape, a thin coating of magnetic permeable material on a narrow strip portion of said support member disposed parallel to the length dimension thereof, magnetic permeable members on said support member closely adjacent opposite edges of said strip portion and magnetically coupled to said coating, means coupled to the ends of said magnetic permeable members for producing opposing magnetic fields of sufficient intensity to saturate the material of said coating everywhere except around a region where the fields cancel, said last-mentioned means including means for moving said region back and forth in the material of said coating, a signal probe arranged on the other side of the tape and including an elongated support member of rectangular cross-section formed of dielectric material substantially coextensive with the width of said tape having a covering of magnetic permeable material on portions thereof to define a magnetic circuit having an elongated air gap, said support member being supported to position said air gap in confronting relationship with said strip portion and closely parallel thereto and therewith defining a recording gap substantially coextensive with the width of the tape through which the tape is adapted to be moved, and a signal coil on said cylindrical support.

11. A magnetic tape transducer comprising, in combination, a magnetizable tape, a flat support member arranged on one side of the tape and having a length dimension at least as great as the width of said tape and having a narrow ridge on one surface thereof oriented parallel to said length dimension, a thin film of magnetic permeable material on said ridge, a pair of magnetic permeable members magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel, said film having a plurality of narrow gaps formed therein oriented transversely of said ridge and distributed along the length dimension of said ridge, said gaps having a smaller dimension in the direction of the length dimension of said ridge than the dimension of said high permeability region in the same direction; and a signal probe structure arranged on the other side of the tape and comprising an elongated flat support member formed of dielectric material having a covering of magnetic permeable material on portions thereof defining a thin probe and a pair of shoes spaced therefrom, said probe structure being supported to position said probe and shoes closely parallel to said ridge and defining therewith a recording gap of a length coextensive with the width of said tape through which said tape is adapted to be moved.

12. A magnetic recorder-reproducer comprising, in combination, a magnetizable tape, a flat support member formed of dielectric material arranged on one side of the magnetizable tape and having a length dimension at least as great as the width of said tape and having in one surface thereof a pair of slots extending in the length direction and spaced apart by a narrow ridge, a thin film of magnetic permeable material on said ridge, a pair of magnetic permeable members disposed in said slots and magnetically coupled to said film of magnetic material, electromagnets coupled to the ends of said magnetic permeable members for producing opposing magnetic fields in said film of magnetic material of sufficient intensity to saturate the material everywhere except around a narrow region where the fields cancel, and a signal probe structure arranged on the other side of the tape and comprising an elongated flat support member of rectangular cross-section formed of dielectric material having a covering of magnetic permeable material on the lateral surfaces thereof except for a narrow strip extending along one lateral surface thereof, a thin sheet of magnetic permeable material within said flat support member disposed in a plane perpendicular to said one lateral surface and centrally of said narrow strip constituting a probe, said probe structure being supported to position said narrow strip closely parallel to said ridge and defining therewith a recording gap substantially coextensive with the width of said tape through which said tape is adapted to be moved, the film of magnetic material on the lateral surfaces of said probe structure and said sheet having a plurality of narrow gaps formed therein lying in parallel planes perpendicular to said length dimension and distributed along said length dimension, a magnetic shield surrounding the lateral surfaces of said probe structure, and signal coupling means including a plurality of conductors within said flat support member and surrounding said probe and with said probe and said film of magnetic permeable material constituting a section of broad band transmission line.

13. A transducer for interaction with a magnetizable tape comprising, a flat support member formed of dielectric material arranged on one side of the tape and having a thin coating of magnetic permeable material on a narrow strip portion thereof extending across the width of the tape, means magnetically coupled to said coating for producing opposing magnetic fields in said coating of sufficient intensity to saturate the material of said coating everywhere except around a narrow region where the fields cancel to thereby produce in said coating a narrow high permeability region, means for shifting the position of said high permeability region along said strip portion, and a signal probe structure arranged on the other side of the tape comprising an elongated support member formed of dielectric material, said elongated support member having a coating of magnetic permeable material on the lateral surfaces thereof except for a narrow elongated area extending centrally along one lateral surface thereof parallel to the long axis thereof, and means supporting said support member to position said narrow elongated area in confronting relationship with said strip portion and closely parallel thereto.

14. Apparatus in accordance with claim 13 wherein said probe structure comprises a pair of elongated flat support members of rectangular cross-section formed of dielectric material, a film of magnetic permeable material on the lateral surfaces of each of said members except for a narrow strip along one edge of one lateral surface, said support members being joined together with said one edge of one in juxtaposition with the said one edge of the other to define a thin probe terminating at said one lateral surface of each support member and a pair of shoes spaced therefrom by elongated air gaps.

15. Apparatus in accordance with claim 13 wherein said probe structure comprises a pair of elongated flat support members of rectangular cross-section, a film of magnetic permeable material on the lateral surfaces of each of said members except for a narrow strip along one edge of one lateral surface, said support members being joined together with said one edge of one in juxtaposition with the said one edge of the other to define a thin probe terminating at said one lateral surface of each support member and a pair of shoes spaced therefrom by elongated air gaps, and signal coupling means including a plurality of conductors within each of said members disposed substantially parallel to the longitudinal axes thereof and connected at the ends of said members to form a coil, said coil and said film of magnetic permeable material constituting a section of broad band transmission line.

References Cited in the file of this patent

UNITED STATES PATENTS

| | | |
|---|---|---|
| 2,743,320 | Daniels | Apr. 24, 1956 |
| 2,955,169 | Stedtnitz | Oct. 4, 1960 |

FOREIGN PATENTS

| | | |
|---|---|---|
| 552,290 | Italy | Nov. 30, 1956 |
| 1,026,974 | Germany | Mar. 27, 1958 |
| 1,154,314 | France | Apr. 4, 1958 |